United States Patent
Mumma et al.

(10) Patent No.: US 11,250,119 B2
(45) Date of Patent: Feb. 15, 2022

(54) MOBILE DEVICE AS A COMPUTER AUTHENTICATOR

(71) Applicant: Bank of America Corporation, Charlotte, NC (US)

(72) Inventors: Robert S. Mumma, Chicago, IL (US); Patrick Burgess, Chicago, IL (US); Trish Gillis, Chicago, IL (US); Taylor Farris, Hoboken, NJ (US); Benjamin Blad, New York, NY (US); Napangsiri Wanpen, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 46 days.

(21) Appl. No.: 16/924,351

(22) Filed: Jul. 9, 2020

(65) Prior Publication Data
US 2022/0012325 A1 Jan. 13, 2022

(51) Int. Cl.
*G06F 21/00* (2013.01)
*G06F 21/35* (2013.01)
*G06F 21/44* (2013.01)
*G06F 21/32* (2013.01)

(52) U.S. Cl.
CPC .............. *G06F 21/35* (2013.01); *G06F 21/32* (2013.01); *G06F 21/44* (2013.01); *G06F 2221/2103* (2013.01)

(58) Field of Classification Search
CPC ........... G06F 21/32; G06F 21/35; G06F 21/44
See application file for complete search history.

(56) References Cited

U.S. PATENT DOCUMENTS

| | | |
|---|---|---|
| 9,451,454 B2 | 9/2016 | Celi, Jr. et al. |
| 9,635,554 B2 | 4/2017 | Pender |
| 9,692,752 B2 | 6/2017 | Keys |
| 9,923,930 B2 | 3/2018 | Zhang et al. |
| 10,032,168 B2 | 7/2018 | Kulkarni et al. |
| 10,182,078 B2 | 1/2019 | Zhang et al. |
| 10,404,678 B2 | 9/2019 | Grajek et al. |
| 10,404,684 B1 | 9/2019 | Chittireddy et al. |
| 2013/0282588 A1 | 10/2013 | Hruska |
| 2017/0085563 A1* | 3/2017 | Royyuru ............ G06Q 20/3223 |
| 2017/0169422 A1 | 6/2017 | Ye et al. |
| 2017/0331824 A1 | 11/2017 | Pender et al. |
| 2018/0006821 A1* | 1/2018 | Kinagi .................. H04L 9/3234 |
| 2020/0045038 A1 | 2/2020 | Mumma et al. |

* cited by examiner

*Primary Examiner* — Jeffrey C Pwu
*Assistant Examiner* — Rodman Alexander Mahmoudi
(74) *Attorney, Agent, or Firm* — Weiss & Arons LLP

(57) ABSTRACT

A system for utilizing a mobile device as a computer authenticator is provided. The system may include a computing application executing on a computing apparatus. The system may include a secure backend server. The secure backend server may include a list of user identifiers, token serial numbers, device registration numbers and computing device identifiers. A pre-registration process may be used to embed a mobile token on a mobile device. A registration process may be used to pair the mobile device to the computing device. An in-use process may be used to authenticate the computing application using the mobile device.

12 Claims, 14 Drawing Sheets

Step A – Online Application A (PC) – Activate device registration

Step B – Online Application A (PC) – Register device

Device registration is successful.

*To register another browser, access ONLINE APPLICATION A (PC) via the new browser and follow the same registration process.

MOBILE DEVICE AS A COMPUTER AUTHENTICATOR

FIELD OF TECHNOLOGY

Aspects of the disclosure relate to authenticating computer applications.

BACKGROUND OF THE DISCLOSURE

Many computer applications involve high security operations. In order to access high security computer applications, a user may be required to authenticate himself prior to accessing the high security computer application.

Once a user has gained access to a high security computer application, the user may be able to retrieve confidential, private or other valuable data. Additionally, once a user has gained access to the high security application, the user may be able to perform high security transactions, such as financial transactions. Such financial transactions may include wire transfers, automated clearing house ("ACH") transactions, electronic check issuance and other such transactions. As such, entry into these high security applications may involve enterprise level security in order to ensure that application access is limited to authentic users.

It would be desirable to provide a mobile device as a computer authenticator. Such a mobile device may ensure that an authenticated user is in the presence of a predetermined mobile device, in the presence of a predetermined computing apparatus and in possession of a preferably predetermined knowledge element and/or a preferably predetermined biometric in order to gain access to the high security computer application.

SUMMARY OF THE DISCLOSURE

A method for utilizing a mobile device as a computer authenticator is provided. The method may include a pre-registration process, registration process and an in-use process.

The pre-registration process may include transmitting a mobile token to a mobile device, and activating the mobile token on the mobile device. During the pre-registration process, the mobile device may receive administrator permission to activate a mobile token. A mobile token may be a software application and/or hardware element. The mobile token may be used to secure one or more other applications.

During the pre-registration process, the mobile device may receive a communication from a secure backend server. The communication may include a hyperlink and an activation code. A user of the mobile device may select the hyperlink. Upon selection, the hyperlink may direct an internet browser to a predetermined web address. The predetermined web address may trigger the download of the mobile token to the mobile device.

The mobile device may validate the activation code by communicating with the secure backend server. The mobile device may enable the user to transmit a biometric identifier. The biometric identifier may be a fingerprint, an iris scan, a face scan, any suitable combination of a fingerprint, an iris scan, face scan or any suitable biometric or any suitable combination of biometrics. The mobile device may validate the biometric identifier with the secure backend server. The mobile device may activate the mobile token upon completion of the activation code validation and the biometric validation.

The method may also include a registration process. The registration process may register a mobile device in order that the mobile device can be used to sign-in to a computing application on a computing apparatus. Examples of a computing apparatus may be a personal computer ("PC"), tablet and a mobile device.

The registration process may include receiving an authentication request at an application at a computing apparatus. The registration process may also include requesting, at the application, user entry of answers to challenge questions and/or user entry of a password.

The registration process may include enabling selection of a selectable item at the application. The selectable item may be a button. The registration process may include transmitting a push notification from the computing apparatus to the mobile token on the mobile device.

The registration process may include requesting entry of a biometric on the mobile device. The registration process may include receiving the biometric on the mobile device. The registration process may include linking the computing apparatus to the mobile device.

The method may also include an in-use process. The in-use process may be the process when the mobile device is used to authenticate a user at a linked computing apparatus.

The in-use process may include receiving entry of a user identifier at the application at the computing apparatus. The in-use process may include receiving selection of a biometric sign-in button at the application at the computing apparatus. The in-use process may include receiving a notification to check the mobile device at the application at the computing apparatus. The in-use process may include receiving a notification to sign-in using the biometric at the mobile device. The in-use process may include receiving the biometric at the mobile device. The in-use process may include authenticating the application at the computing apparatus. The in-use process may include displaying a successful sign-in confirmation on the mobile device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 7 shows an illustrative screenshot in accordance with principles of the disclosure;

FIG. 8 shows another illustrative screenshot in accordance with principles of the disclosure;

FIG. 10 shows an illustrative screenshot in accordance with principles of the disclosure;

FIG. 12 shows another illustrative screenshot in accordance with principles of the disclosure;

DETAILED DESCRIPTION OF THE DISCLOSURE

Figure 1:
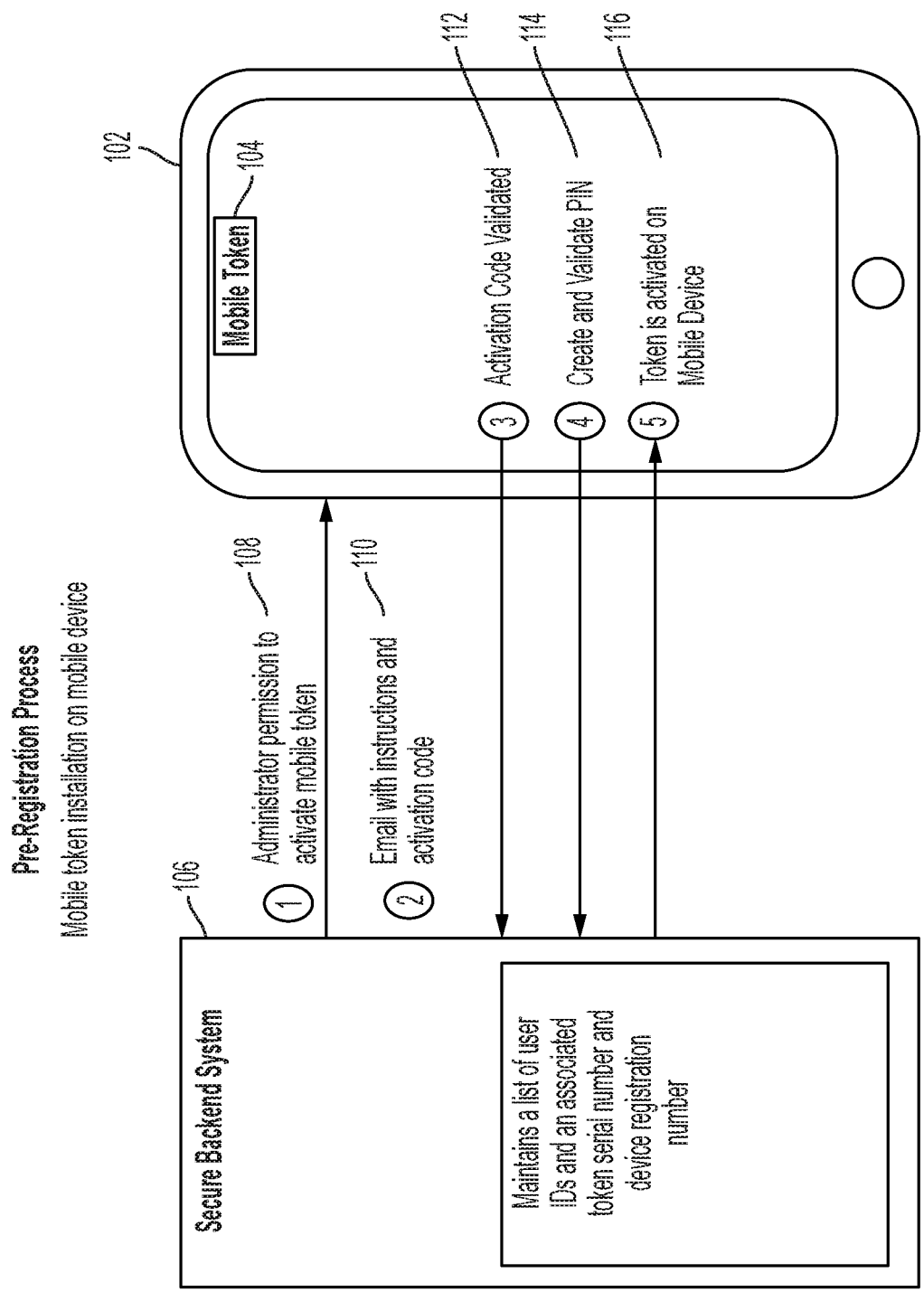
FIG. 1 shows an illustrative diagram in accordance with principles of the disclosure.

Apparatus and methods for utilizing a mobile device as a computer authenticator is provided. The system may include a computing apparatus. The computing apparatus may include a computing application.

The system may include a secure backend server. The secure backend server may include a list of user identifiers, token serial numbers, device registration numbers and computing device identifiers.

During a pre-registration process, a mobile token may be planted and activated on a mobile device. As such, the mobile device may receive permission to activate the mobile token. The mobile device may receive a communication from the secure backend server. The communication may include the mobile token (or a hyperlink that enables download of the mobile token) and an activation code.

The mobile device may validate the activation code by communicating with the secure backend server. The mobile device may receive selection of a PIN. The mobile device may validate the PIN with the secure backend server. Upon completion of the activation code validation and PIN validation, the mobile token may be activated on the mobile device. The secure backend server may store a user identifier that identifiers a user of the mobile device, a token serial number that identifies the mobile token and a device registration number that identifies the mobile device.

During a registration process, the mobile device may be tied to the computing apparatus in order that the mobile device can be used to authenticate an application on the computing apparatus. The computing apparatus may receive an authentication request. The computing apparatus may request user entry of answers to challenge questions and/or user entry of a password. The computing apparatus may enable selection of a selectable item, such as a button. The button may be a software button. The computing apparatus may, upon selection of the selectable item, transmit a "push" notification to the mobile token on the mobile device. A "push" notification may be an automated message sent by an application to a user when the application is not open. The "push" notification may be transmitted to the mobile token on the mobile device. The mobile token may display the "push" notification on a screen of the mobile device.

Upon receipt of the "push" notification, the mobile token may initiate a request for entry of a PIN and/or biometric on the mobile device. Upon receipt of the PIN and/or biometric on the mobile device, the mobile device may link to the computing apparatus. The secure backend server may store a computing apparatus identification number that identifies the computing device in the list.

The secure backend server may store a data link between the stored token serial number, the stored computing apparatus identification number, the device registration number and the stored user identifier.

During an in-use process, the mobile device may be used to authenticate a user in order to sign-in to the application executing on the computing apparatus. The computing apparatus may receive entry of a user identifier. The computing device may receive selection of a biometric sign-in together with the entry of the user identifier. The computing apparatus may transmit a request to the secure backend server. The request may include the user identifier.

The secure backend server may identify the mobile device based on the device registration number associated with the user identifier. The secure backend server may transmit a "push" notification to the mobile token on the mobile device. The mobile token may request entry of the PIN and/or biometric. Upon receipt of the PIN and/or biometric at the mobile device, the mobile token may transmit an authenticated communication to the computing apparatus. The mobile device may display a successful sign-in confirmation upon transmission of the authenticated communication to the computing apparatus. The computing apparatus may authenticate the computer application.

In some embodiments, the secure backend server may transmit a notification to the computing apparatus. The notification may include a message to check the mobile device.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram may show the communications between a mobile device and a secure backend system during a pre-registration process. The pre-registration process may include mobile token installation on a mobile device.

Mobile device 102 may communicate with secure backend system 106. Mobile device 102 may request administrator permission to receive and install a mobile token from secure backed system 106. Step 1 shows secure backend system 106 may transmit, in response to the request for permission, administrator permission to mobile device 102 to activate a mobile token, as shown at 108.

It should be appreciated that, in some embodiments, mobile token 104 may be transmitted to mobile device 102 prior to receiving the administrator permission. However, mobile token 104 may not be activated until steps 1-5, shown at 108-116, have been performed. In certain embodiments, mobile token 104 may be transmitted to mobile device 102 with the administrator permission. In other embodiments, mobile token 104 may be included in the email with instructions shown at 110. In yet other embodiments, a hyperlink may be included in the email with instructions, shown at 110. The hyperlink, when selected may open a browser and direct the browser to a web page that downloads mobile token 104 to mobile device 102.

Step 2 shows that secure backend system 106 may transmit an email with instructions and an activation code to mobile device 102, as shown at 110.

Step 3 shows that mobile device 102 may communicate with secure backend system 106 to validate the received activation code, as shown at 112.

Step 4 shows that mobile device 102 may create and validate a personal identification number ("PIN") with secure backend system 114. In some embodiments, a biometric identifier, such as a fingerprint, iris scan or face scan may be used instead of, or together with, a PIN. It should be appreciated that, in some embodiments, the biometric may be retrieved by, verified and stored on mobile device 102 itself. As such, mobile device 102 may verify the biometric identifier when the biometric identifier is used to authenticate the user to the mobile token. In other embodiments, secure backend system 106 may store a copy of the biometric. As such, secure backend system 106 may verify the biometric identifier when the biometric identifier is used, at a later time from when the biometric identifier was stored, to authenticate the user to the mobile token.

Once the PIN and/or the biometric identifier is created and validated, mobile token 104 may be activated on mobile device 102. Step 5 shows that the token is activated on the mobile device, as shown at 116.

In order to maintain records of which users are associated with which mobile devices, and in order to maintain records of which mobile tokens are resident on which mobile devices, secure backend system 106 may maintain a list. The list may include user identifiers, associated token serial numbers and device registration numbers. In some embodiments, each user identifier may only be associated with one mobile token. As such, once a user identifier is associated with a mobile token, the secure backend system may prevent additional mobile tokens from being activated for an already-committed user identifier.

Figure 2:
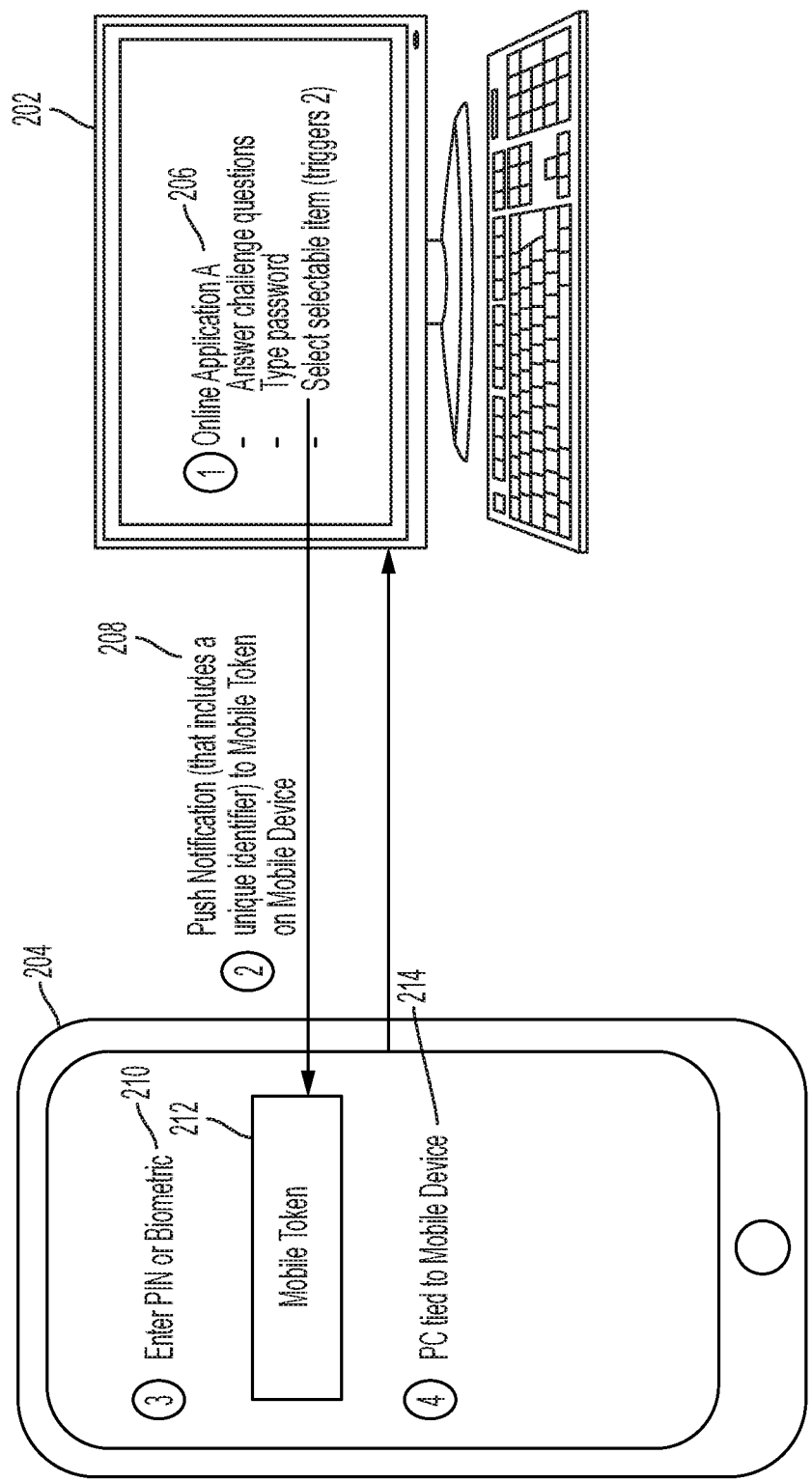
FIG. 2 shows another illustrative diagram in accordance with principles of the disclosure.

FIG. 2 shows another illustrative diagram. The illustrative diagram shows a registration process for installing a mobile device-based authenticator on a single personal computer ("PC") and a single mobile device.

Once a mobile token has been successfully installed on a mobile device, the mobile token may be used to register the hosting mobile device. The token-based registration may be used to perform mobile device-based authentication on a computing apparatus, such as a PC.

In order to register a computing apparatus by tying the computing device to a mobile device, a registration process may be executed. The registration process may include step 1, shown at 206. At step 1, online application A may be logged into and open on computing apparatus 202. Online application A may receive a request to register mobile device-based authenticator registration on a single PC and a single mobile device. A PC user may be requested to answer challenge questions and type a password. Upon entry of correct answers to challenge questions and upon entry of a password, the user may be enabled to select a selectable item.

Selection of the selection item may trigger step 2. At step 2, a "push" notification may be pushed to mobile token 212. Mobile token 212 may be resident on mobile device 204. The "push" notification may include a unique identifier.

At step 3, a user may be prompted to enter a PIN and/or biometric on mobile device 204, shown at 210. As shown at step 4, upon entry of the PIN and/or biometric, the PC may be tied to the mobile device, as shown at 214. The successful registration process may be displayed on mobile device 204 and/or computing apparatus 202.

Figure 3:
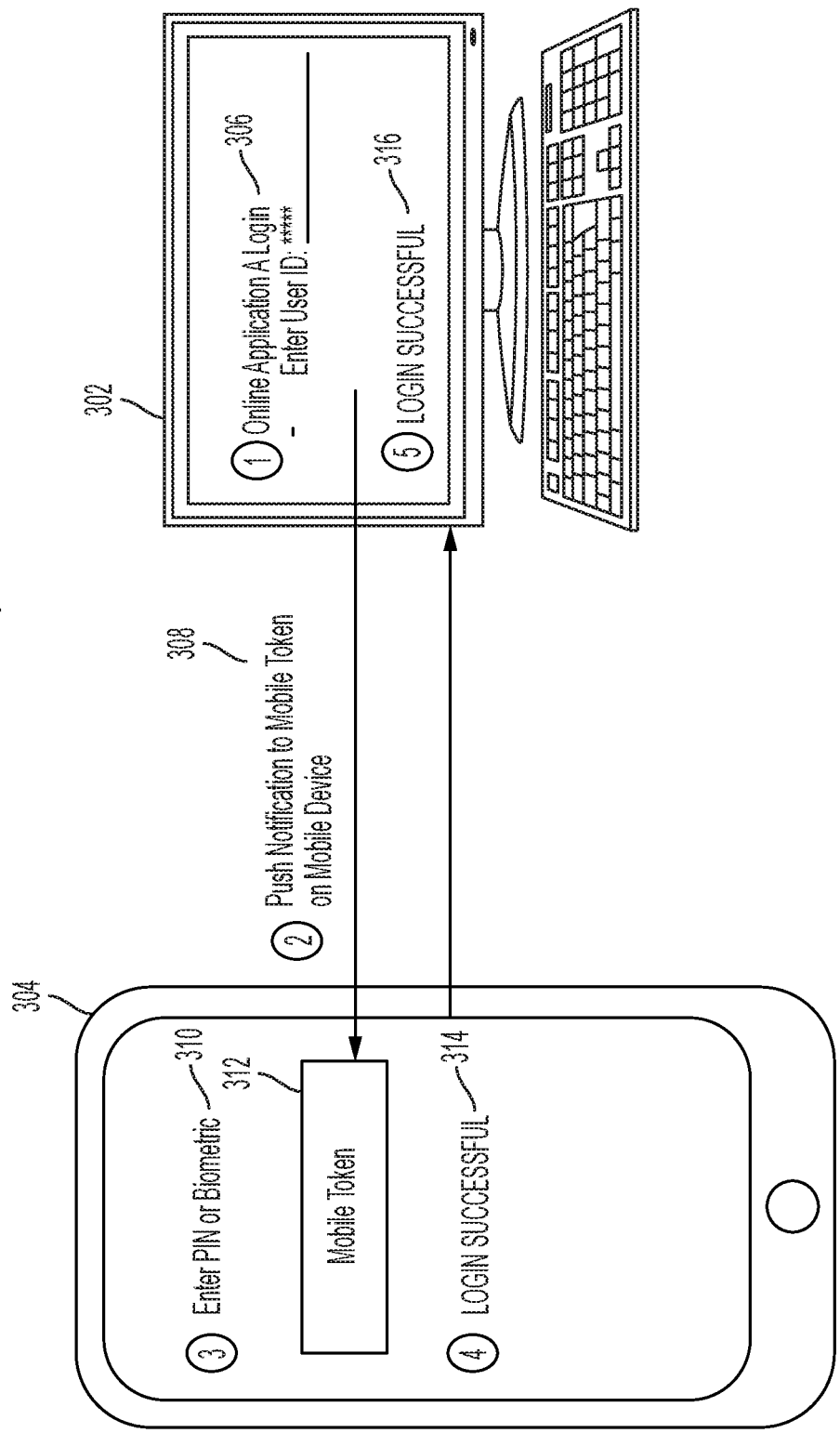
FIG. 3 shows yet another illustrative diagram in accordance with principles of the disclosure.

FIG. 3 shows another illustrative diagram. The illustrative diagram shows an in-use process for authenticating access to a PC using a mobile device.

Step 1, shown at 306, includes the entry of a user identifier in to a computing application executing on computing device 302. Step 2, shown at 308, includes the transmission of a "push" notification to mobile token 312. Mobile token 312 may reside on mobile device 304. Step 3, shown at 310, includes user entry of a PIN or biometric at mobile device 304. Step 4, shown at 314, includes a "login successful" message displayed on mobile device 304. Step 5, shown at 316, includes a "login successful" message displayed on computing device 302.

Figure 4:
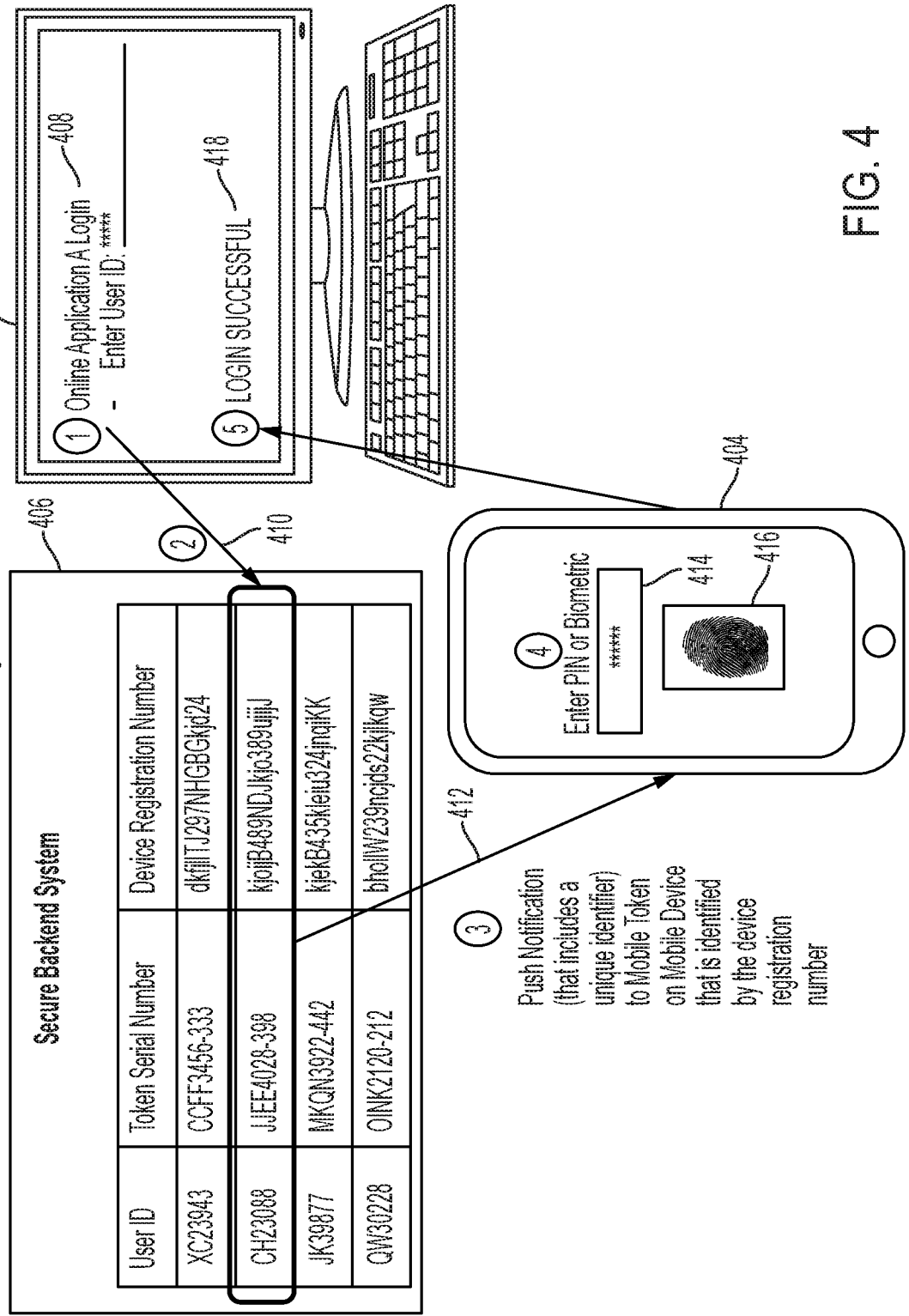
FIG. 4 shows still another illustrative diagram in accordance with principles of the disclosure.

FIG. 4 shows an illustrative diagram. The illustrative diagram shows further detail of the in-use process for authenticating access to a PC using a mobile device.

Step 1, shown at 408, includes the entry of a user identifier in to a computing application executing on computing device 402. Upon entry of the user identifier, the computing application may communicate with secure backend system 406. The communication may include the user identifier, or an encrypted form of the user identifier.

Secure backend system 406 may receive the user identifier, or the encrypted form of the user identifier, as shown at 410. In the event that the user identifier is encrypted, secure backend system 406 may decrypt the user identifier. Secure backend system 406 may search a database, located at secure backend system 406, to identify a mobile token serial number and a device registration number associated with the user identifier. Upon identification of the token serial number and device registration number, secure backend system 406 transmits a "push" notification to a mobile device, identified by the device registration number. Step 3, shown at 412, shows secure backend system 406 transmitting the "push" notification to mobile device 404.

It should be appreciated that, because the system may be a one-computing apparatus to a one-mobile device architecture, there may preferably be one user identifier for each device registration number. Also, in some embodiments, the database may also include a computing device registration number. As such, in order to utilize the mobile device authentication process, a user may be located at one predetermined computer, with access to one mobile device, in order to effectively access the computing application.

Step 4, shown on mobile device 404, includes a request for entry of a PIN and/or biometric. A PIN may be entered into entry box 414. A biometric, such as a fingerprint, face scan and iris scan may be entered in to entry box 416 on mobile device 404. Upon entry of a correct PIN and/or biometric, mobile device 404 may transmit a login successful message to computing device 402. Upon receipt of the login successful message at computing device 402, computing device 402 displays a login successful message, as shown at 418.

Figure 5:
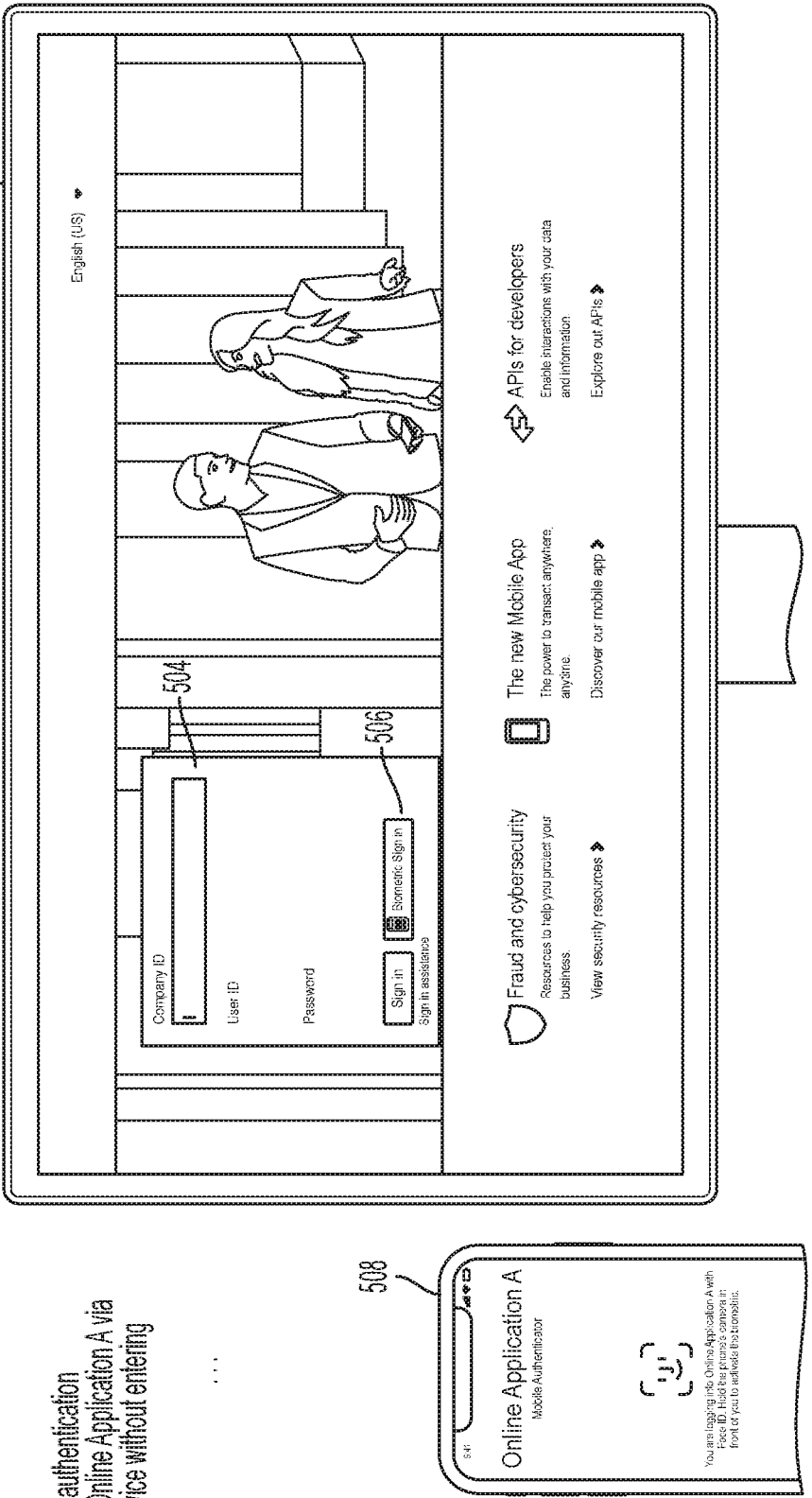
FIG. 5 shows yet another illustrative diagram in accordance with principles of the disclosure.

FIG. 5 shows an illustrative diagram. The illustrative diagram shows authenticating an identity via biometrics when signing in to online application A. The illustrative diagram shows that the authentication may be automatic. As such, a user may sign in to online application A via a mobile device without entering a password.

The illustrative diagram includes computing device 502 and mobile device 508. Computing device 502 may include a computing application. The computing application may include sign-in entry box 504. As shown, a user may enter a company identifier, a user identifier and a password and select sign-in. However, a user may also enter a user identifier (in some embodiments, and a company identifier) and select biometric sign-in selectable button 506.

Upon selection of biometric sign-in selectable button 506, mobile device 508 may request a biometric identifier. Mobile device 508 may request, for example, a face identifier in order to sign in to the computing application displayed on computing device 502.

Figure 6:
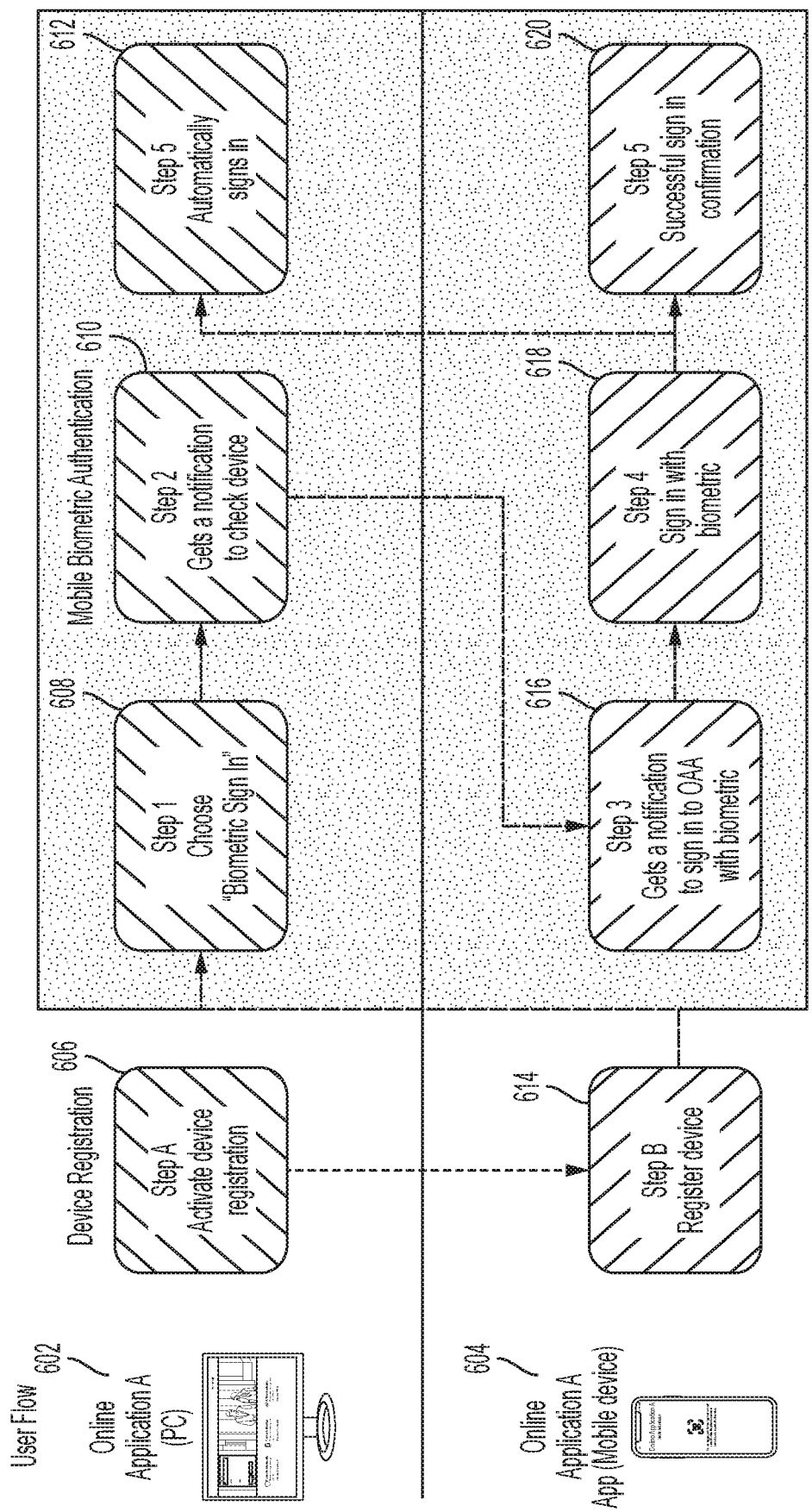
FIG. 6 shows an illustrative flow chart in accordance with principles of the disclosure.

FIG. 6 shows an illustrative flow diagram. The illustrative flow diagram shows the registration and authentication processes as they appear to a user. A user may be associated with online application A (PC), as shown at 602. The user may also be associated with online application A App (mobile device), as shown at 604.

Device registration may include step A and step B, shown at 606 and 614. Step A, shown at 606, may include activating device registration on the PC. Step B, shown at 614, may include registering the mobile device using an authentication platform on the mobile device.

Mobile Biometric Authentication may include steps 1-5, shown at 608-620. Step 1, shows at 608, includes choosing biometric sign-in at the PC. Step 2, shown at 610, includes getting a notification on the PC. The notification may instruct the user to check or otherwise evaluate the mobile device.

Step 3, shown at 616, includes getting a notification, on the mobile device. The notification may instruct a user to enter a biometric identifier on the mobile device in order to sign in to the application executing on the PC. Step 4, shown at 618, may include a user entering a biometric identifier on the mobile device.

Step 5, may be shown at both 612 and 620. Step 5 may show a successful sign-in. As shown at 612, step 5 may include automatically signing in to the computing application on the PC. As shown at 620, step 5 may include presenting a display of a successful sign-in confirmation.

Figure 7:
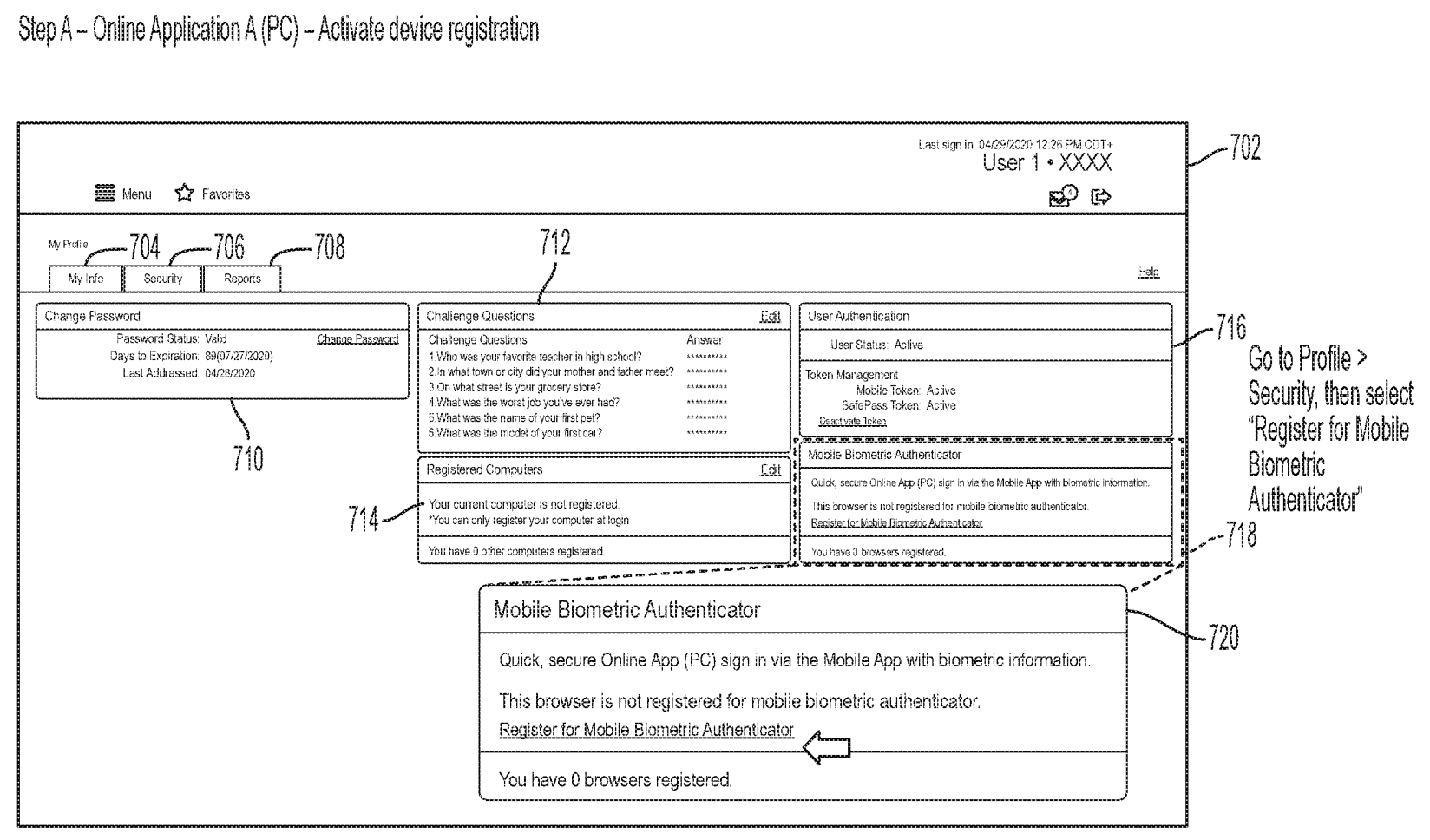

FIG. 7 shows an illustrative screenshot. The illustrative screenshot may further illustrate step A that was shown in FIG. 6. Step A may include activation of device registration on the online application of the computing device. Webpage 702 may be a page included in an online portal. The online portal may include the following tabs: my info (704), security (706) and reports (708). Webpage 702 may be open to security tab 706.

Security tab 706 may include a change password section, shown at 710. Change password section 710 may enable a user to change a password.

Security tab 706 may include a challenge questions section, shown at 712. Challenge questions section 712 may enable a user to enter, review, respond to and/or edit challenge questions.

Security tab 706 may include a user authentication section, shown at 716. User authentication section 716 may display authentication status and token management data. User authentication section 716 may also enable deactivation of the token.

Security tab 706 may also include a registered computers section, shown at 714. Registered computers section 714 may display data regarding registered computers.

Security tab 706 may also include mobile biometric authenticator section 718. Mobile biometric authenticator section 718 may be shown enlarged at 720. Mobile biometric authenticator section 720 may enable a user to register for mobile biometric authentication and/or display data relating to browsers that registered for biometric authentication. Mobile biometric authentication section 720 may show that a mobile device is not currently registered.

Figure 8:
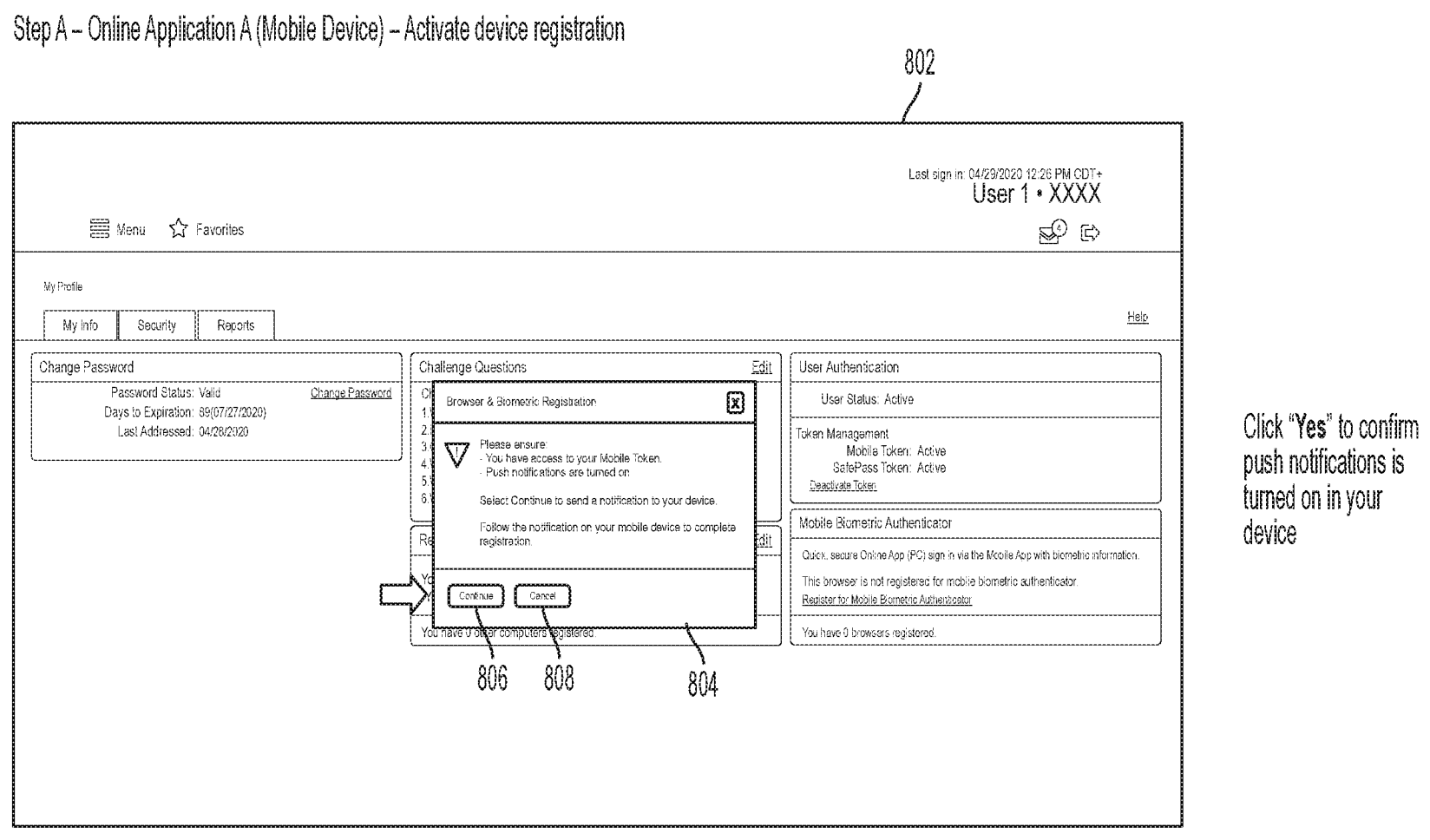

FIG. 8 shows an illustrative screenshot. The illustrative screenshot may be displayed, upon selection, a selectable button within mobile biometric authenticator, shown in FIG. 7. Screen 802 may include box 804. Box 804 may instruct that, in order to register for mobile biometric authentication, the user may require access to the mobile token and "push" notifications on the mobile device may be turned on. Box 804 may include continue button 806 and cancel button 808.

Figure 9:
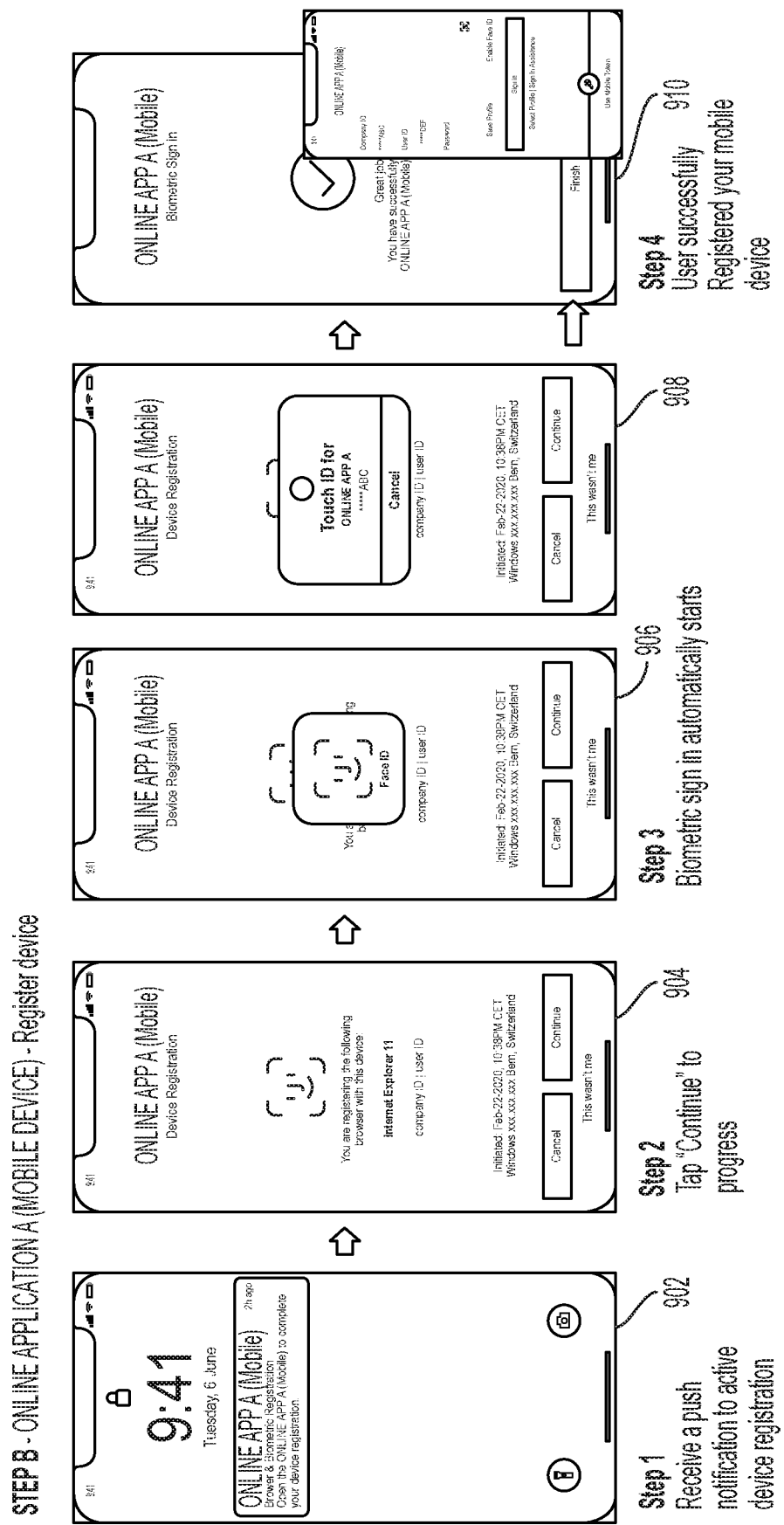
FIG. 9 shows an illustrative diagram in accordance with principles of the disclosure.

FIG. 9 shows illustrative screenshots. The illustrative screenshots may be displayed on a mobile device during step B (as shown in FIG. 6). Step B may include registering the mobile device in order that the mobile device can be used to authenticate the computing apparatus.

The mobile device registration process may be initiated with a push notification being received at the mobile device, as shown at 902. A user may be instructed to open a computing application on the mobile device to complete the mobile device registration.

The user may open the computing application, as shown at 904. The user may select the continue button in order to proceed to the next screen. The next screen may request a biometric identifier from the user. The biometric identifier may be a face scan, as shown at 906. The biometric identifier may be a touch identifier, or fingerprint scan, as shown at 908.

A user may select finish to complete the registration process, as shown at 910. As such, upon selection of the finish button, the mobile device may be registered.

FIG. 10 shows an illustrative screenshot. The illustrative screenshot displays webpage 1002. Webpage 1002 may be similar to webpage 702 (shown in FIG. 7). However, webpage 1002 may be displayed after the registration of a mobile device. In webpage 1002, mobile biometric authenticator section shown at 1004 and enlarged at 1006 may include a registered mobile device.

Figure 11:
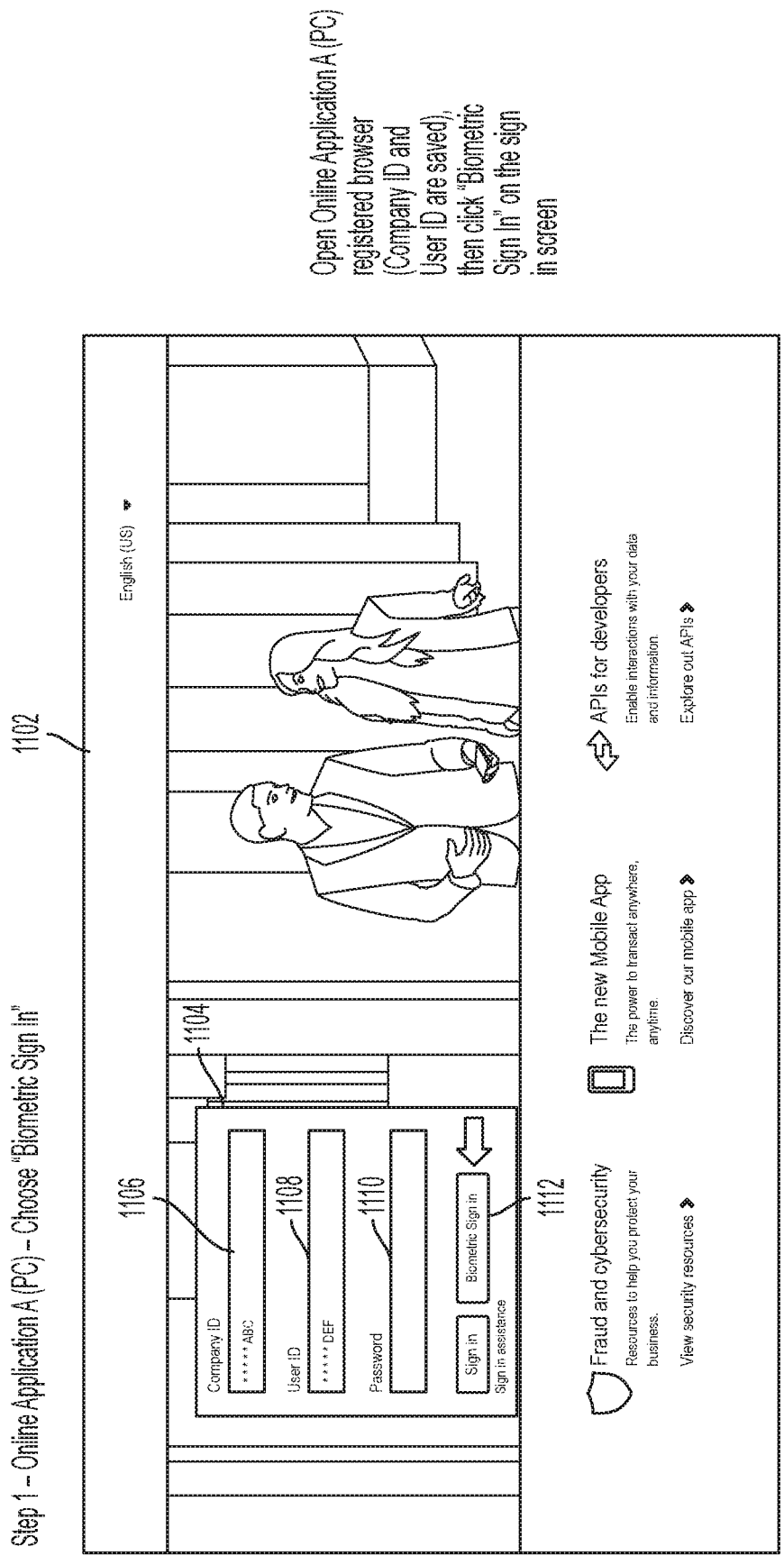
FIG. 11 shows another illustrative screenshot in accordance with principles of the disclosure.

FIG. 11 shows an illustrative screenshot. The illustrative screenshot illustrates step 1 (shown in FIG. 6). Webpage 1102 may include entry box 1104. Entry box 1104 may include company identifier entry field 1106, user identifier entry field 1108 and password entry field 1110. Entry box 1104 may also include biometric sign-in button 1112. Biometric sign-in button 1112 may be activated upon entry of a user identifier. In some embodiments, biometric sign-in button 1112 may be activated upon entry of a user identifier and a company identifier.

Figure 12:
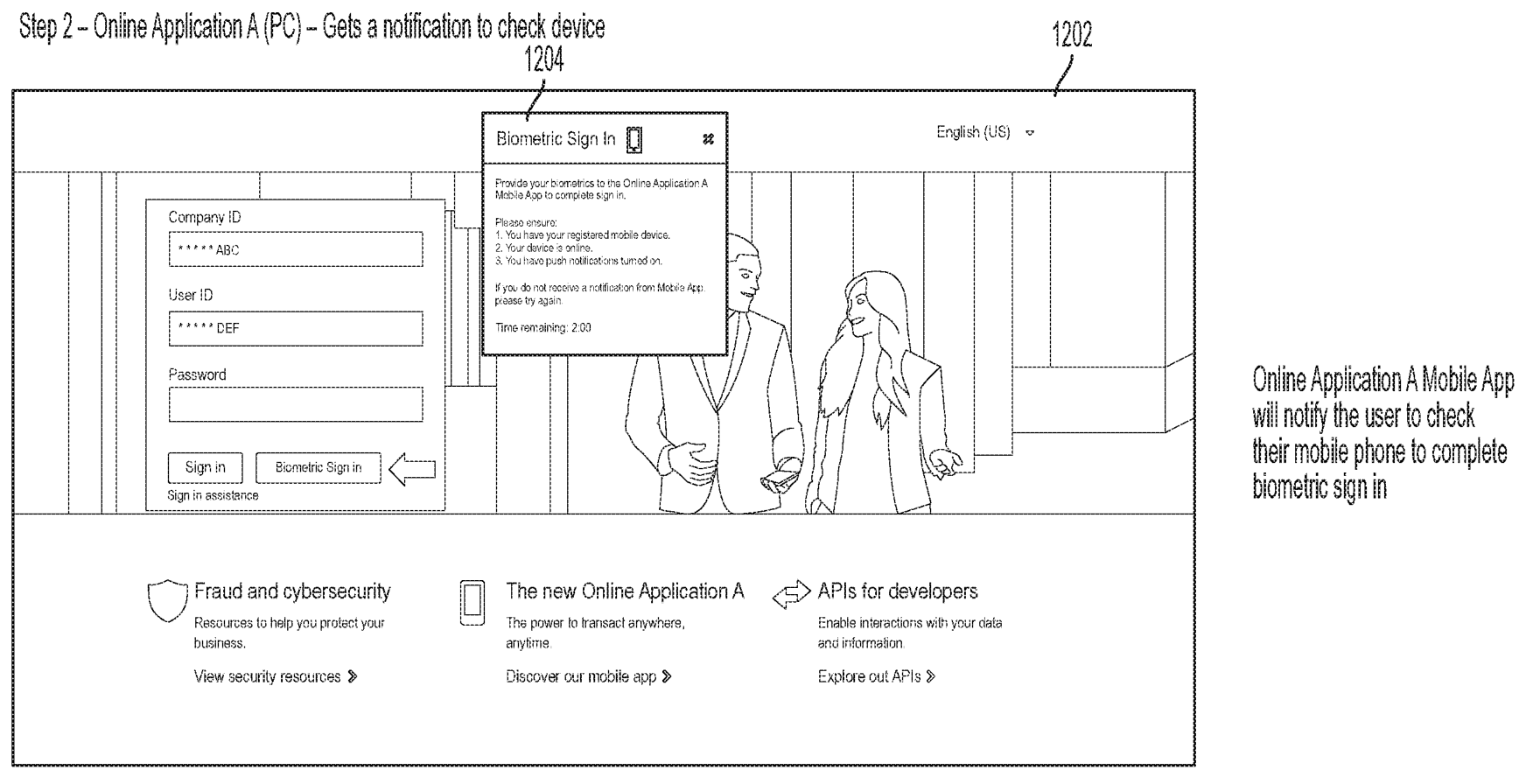

FIG. 12 shows an illustrative screenshot. The illustrative screenshot may display a webpage that may be presented upon selection of biometric sign-in button 1112 (shown in FIG. 11). Instruction box 1204 instructs a user to provide a biometric identifier to the linked mobile device in order to be authenticated into the online application. Instruction box 1204 may also include a timer. The timer may instruct an amount of time remaining to enter the biometric identifier. The time limit may provide an additional level of security.

Figure 13:
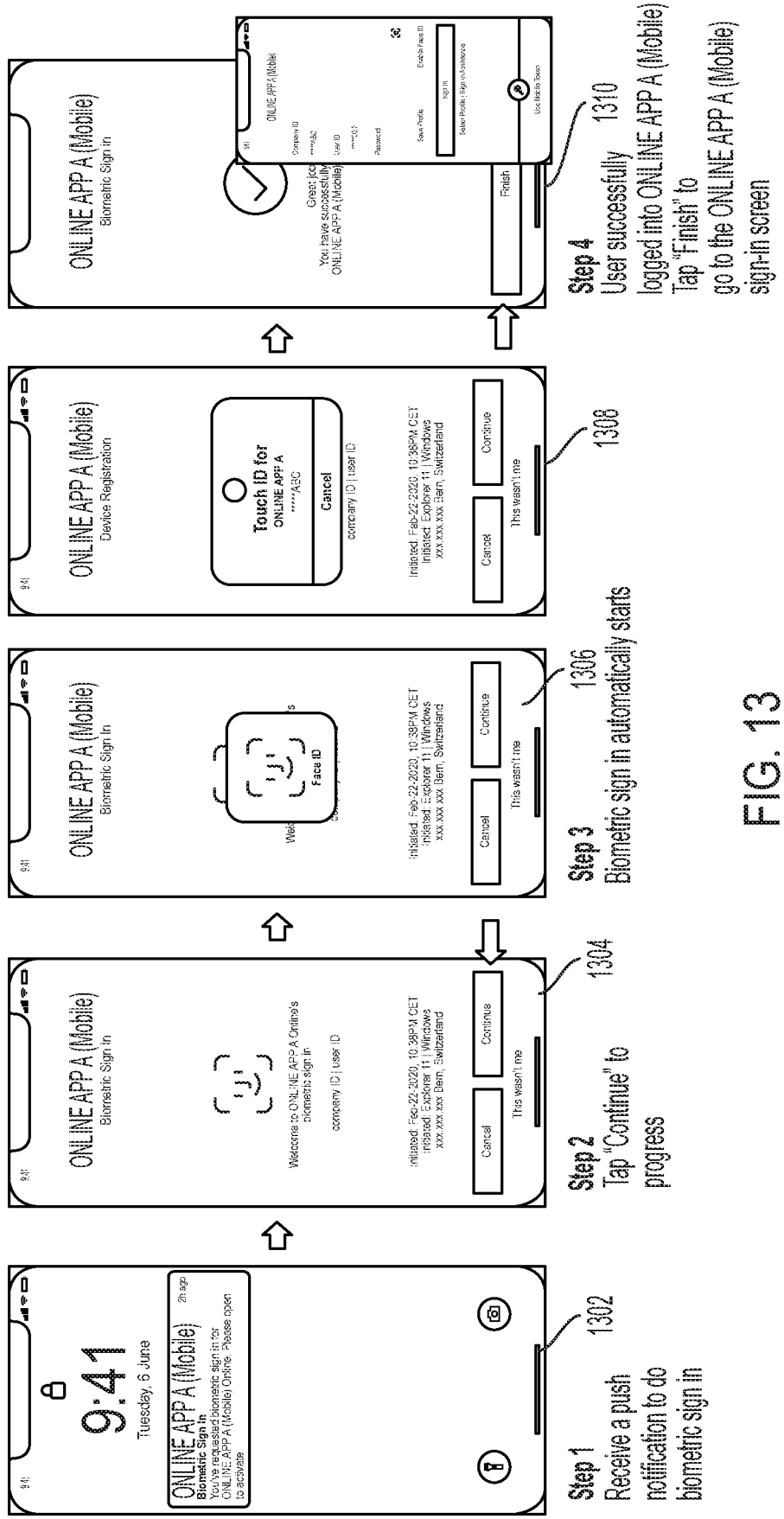
FIG. 13 shows illustrative screenshots in accordance with principles of the disclosure.

FIG. 13 shows illustrative screenshots. The illustrative screenshots may include steps 3-5 of the mobile device (as shown in FIG. 6). Steps 3-5 may show sign-in with biometric identifier on a mobile device. The mobile device may receive a push notification to perform a biometric sign-in, as shown at 1302. A user may be instructed to open a computing application on the mobile device in order to perform the biometric sign-in. Within the computing application, a user may select continue to progress to the next screen, as shown 1304. A user may be requested to enter a biometric identifier, as shown at 1306 and 1308. Once the biometric identifier is received at the mobile device, a "login successful" message may be displayed on the mobile device, as shown at 1310.

Figure 14:
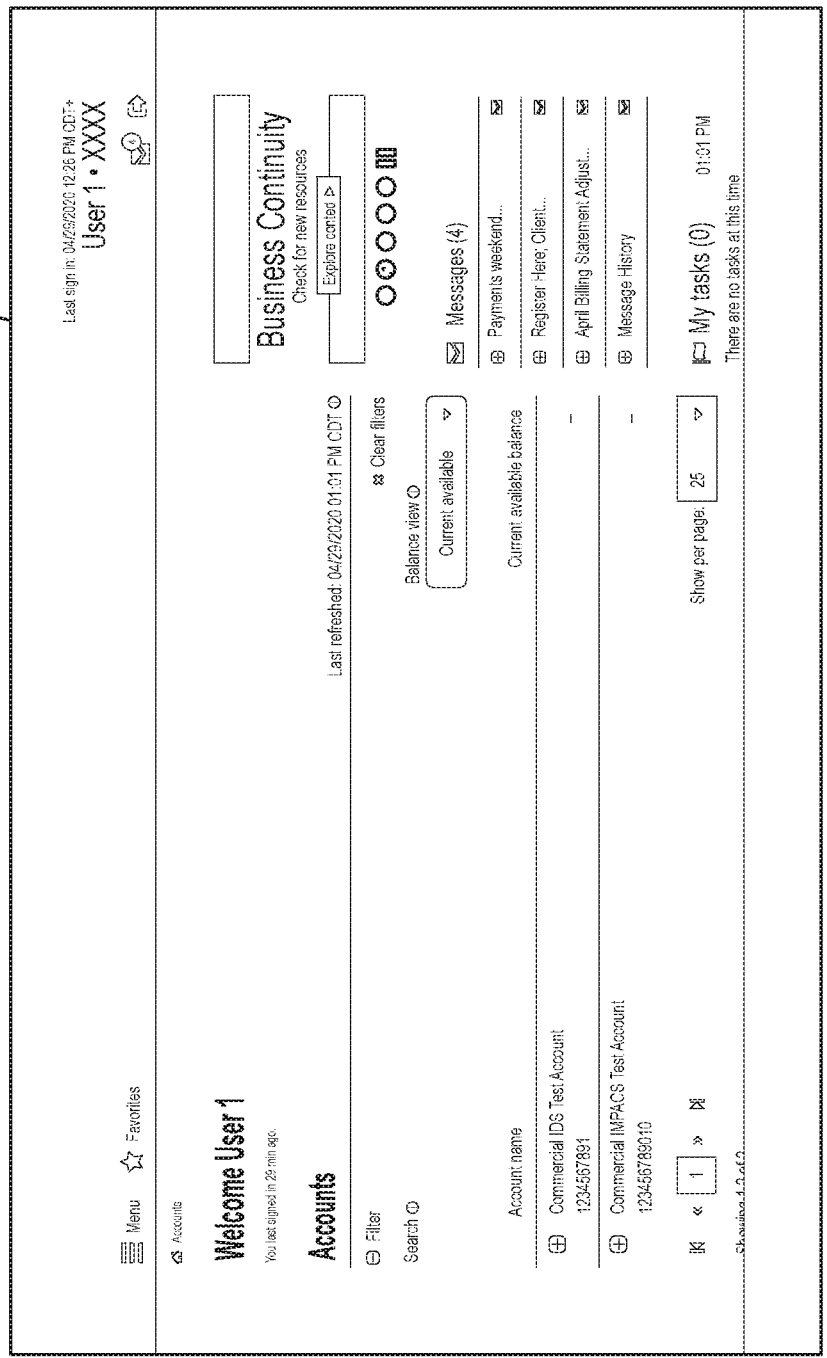
FIG. 14 shows an illustrative screenshot in accordance with principles of the disclosure.

FIG. 14 shows an illustrative screenshot. The illustrative screenshot may include step 5 of the computing device (as shown in FIG. 6). Webpage 1402 shows that, once a user has provided a correct biometric identifier to the mobile device, the computing application on the computer may be automatically opened.

Thus, a system for mobile device as a computer authenticator is provided. Persons skilled in the art will appreciate that the present invention can be practiced by other than the described embodiments, which are presented for purposes of illustration rather than of limitation. The present invention is limited only by the claims that follow.

What is claimed is:

1. A system for utilizing a mobile device as a computer authenticator, the system comprising:
   a computing apparatus comprising a computing application; and
   a secure backend server comprising a list of user identifiers, token serial numbers, device registration numbers and computing device identifiers;
   wherein:
   during a pre-registration process:
       the mobile device receives administrator permission to activate a mobile token;
       the mobile device receives a communication, from the secure backend server, the communication comprising the mobile token and an activation code;
       the mobile device validates the activation code by communicating with the secure backend server;
       the mobile device receives a selection of a personal identification number ("PIN");
       the mobile device validates the PIN with the secure backend server;
       upon completion of the activation code validation and the PIN validation, the mobile token is activated on the mobile device;
       the secure backend server stores a user identifier that identifies a user of the mobile device, a token serial number that identifies the mobile token and a device registration number that identifies the mobile device;
   during a registration process:
       the computing apparatus receives an authentication request;
       the computing apparatus requests user entry of answers to challenge questions and/or user entry of a password;
       the computing apparatus enables selection of a selectable item;
       upon selection of the selectable item, the computing apparatus transmits a push notification to the mobile token on the mobile device;
       the mobile token initiates a request for entry of a PIN and/or biometric on the mobile device;
       upon receipt of the PIN and/or biometric on the mobile device, the mobile device links to the computing apparatus;
       the secure backend server stores a computing apparatus identification number that identifies the computing device in the list;
   during an in-use process:
       the computing apparatus receives entry of the user identifier;
       the computing apparatus transmits a request to the secure backend server, the request comprising the user identifier;
       the secure backend server identifies the mobile device based on the device registration number associated with the user identifier;
       the secure backend server transmits a push notification to the mobile token on the mobile device;
       the mobile token requests entry of the PIN and/or biometric;
       upon receipt of the PIN and/or biometric at the mobile device, the mobile token transmits an authenticated communication to the computing apparatus; and
       the computing apparatus authenticates the computer application.

2. The system of claim 1, wherein the secure backend server stores a data link between the stored token serial number, the stored computing apparatus identification number, the device registration number and the stored user identifier.

3. The system of claim 1, wherein the in-use process further comprises the secure backend server transmitting a notification to the computing apparatus, said notification comprising a message to check the mobile device.

4. The system of claim 1, wherein the in-use process further comprises the mobile device displays a successful sign-in confirmation upon transmission of the authenticated communication to the computing apparatus.

5. The system of claim 1, wherein the biometric is a fingerprint, an iris scan, a face scan or a combination of a fingerprint, iris scan or face scan.

6. The system of claim 1, wherein the in-use process further comprises the computing device receives selection of a biometric sign-in together with the entry of the user identifier.

7. A system for utilizing a mobile device as a computer authenticator, the system comprising:
   a computing apparatus comprising a computing application; and
   a secure backend server comprising a list of user identifiers, token serial numbers, device registration numbers and computing device identifiers;
   wherein:
   during a pre-registration process:
       the mobile device receives administrator permission to activate a mobile token;
       the mobile device receives a communication, from the secure backend server, the communication comprising an activation code and a hyperlink;
       upon selection of the hyperlink by the mobile device, the mobile device is directed to a web address that triggers the download of the mobile token;
       the mobile device validates the activation code by communicating with the secure backend server;
       the mobile device receives a selection of a personal identification number ("PIN");
       the mobile device validates the PIN with the secure backend server;
       upon completion of the activation code validation and the PIN validation, the mobile token is activated on the mobile device;
       the secure backend server stores a user identifier that identifies a user of the mobile device, a token serial number that identifies the mobile token and a device registration number that identifies the mobile device;
   during a registration process:
       the computing apparatus receives an authentication request;

the computing apparatus requests user entry of answers to challenge questions and/or user entry of a password;

the computing apparatus enables selection of a selectable item;

upon selection of the selectable item, the computing apparatus transmits a push notification to the mobile token on the mobile device;

the mobile token initiates a request for entry of a PIN and/or biometric on the mobile device;

upon receipt of the PIN and/or biometric on the mobile device, the mobile device links to the computing apparatus;

the secure backend server stores a computing apparatus identification number that identifies the computing device in the list;

during an in-use process:

the computing apparatus receives entry of the user identifier;

the computing apparatus transmits a request to the secure backend server, the request comprising the user identifier;

the secure backend server identifies the mobile device based on the device registration number associated with the user identifier;

the secure backend server transmits a push notification to the mobile token on the mobile device;

the mobile token requests entry of the PIN and/or biometric;

upon receipt of the PIN and/or biometric at the mobile device, the mobile token transmits an authenticated communication to the computing apparatus; and the computing apparatus authenticates the computer application.

8. The system of claim 7, wherein the secure backend server stores a data link between the stored token serial number, the stored computing apparatus identification number, the device registration number and the stored user identifier.

9. The system of claim 7, wherein the in-use process further comprises the secure backend server transmitting a notification to the computing apparatus, said notification comprising a message to check the mobile device.

10. The system of claim 7, wherein the in-use process further comprises the mobile device displays a successful sign-in confirmation upon transmission of the authenticated communication to the computing apparatus.

11. The system of claim 7, wherein the biometric is a fingerprint, an iris scan, a face scan or a combination of a fingerprint, iris scan or face scan.

12. The system of claim 7, wherein the in-use process further comprises the computing device receives selection of a biometric sign-in together with the entry of the user identifier.

\* \* \* \* \*